United States Patent
Lampert

(10) Patent No.: US 6,960,028 B2
(45) Date of Patent: Nov. 1, 2005

(54) OPTICAL FIBER CONNECTION UTILIZING FIBER CONTAINING FERRULES

(75) Inventor: Norman R. Lampert, Norcross, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/658,733

(22) Filed: Sep. 9, 2003

(65) Prior Publication Data

US 2005/0041931 A1 Feb. 24, 2005

(51) Int. Cl.[7] .............................. G02B 6/36
(52) U.S. Cl. .................................... 385/81
(58) Field of Search ................ 385/60, 62, 78, 385/81

(56) References Cited

U.S. PATENT DOCUMENTS

| | | | |
|---|---|---|---|
| 6,128,927 A | 10/2000 | Ahrens et al. | |
| 6,317,555 B1 * | 11/2001 | Maron et al. | 385/137 |
| 6,350,065 B1 * | 2/2002 | Arima | 385/95 |
| 6,358,874 B1 | 3/2002 | Kobayashi et al. | |
| 6,533,469 B1 | 3/2003 | Nakamura et al. | |

FOREIGN PATENT DOCUMENTS

JP       58216217 A  * 12/1983   ............ G02B/7/26

OTHER PUBLICATIONS

Hirohisa Iwai, et al., Properties of Ni–Ti Leaf Springs, Proceedings of the Second International Conference on Shape Memory, 1997, Pacific Grove, CA.

Satoshi Takaoka, et al., Applications and Development of Shape Memory and Superelastic Alloys in Japan, The International Conference on Superelastic Technologies and Shape Memory Materials, Sep. 2–6, 2001, Kunming, China.

* cited by examiner

Primary Examiner—Khiem Nguyen

(57) ABSTRACT

A ferrule for use in optical fiber connections has an optical fiber containing a bore extending therethrough. Within the bore is a member of shaped memory alloy (SMA) which clamps and affixes the fiber firmly in place within the ferrule without the necessity of cementing the fiber in place. The shaped memory alloy has two states: the initial or primary state and the secondary or deformed state. In the embodiments of the invention, the member is deformed from the initial state to the secondary state and the fiber is inserted in the ferrule. The member is then returned to the primary state in which it firmly clamps the fiber within the ferrule.

13 Claims, 4 Drawing Sheets

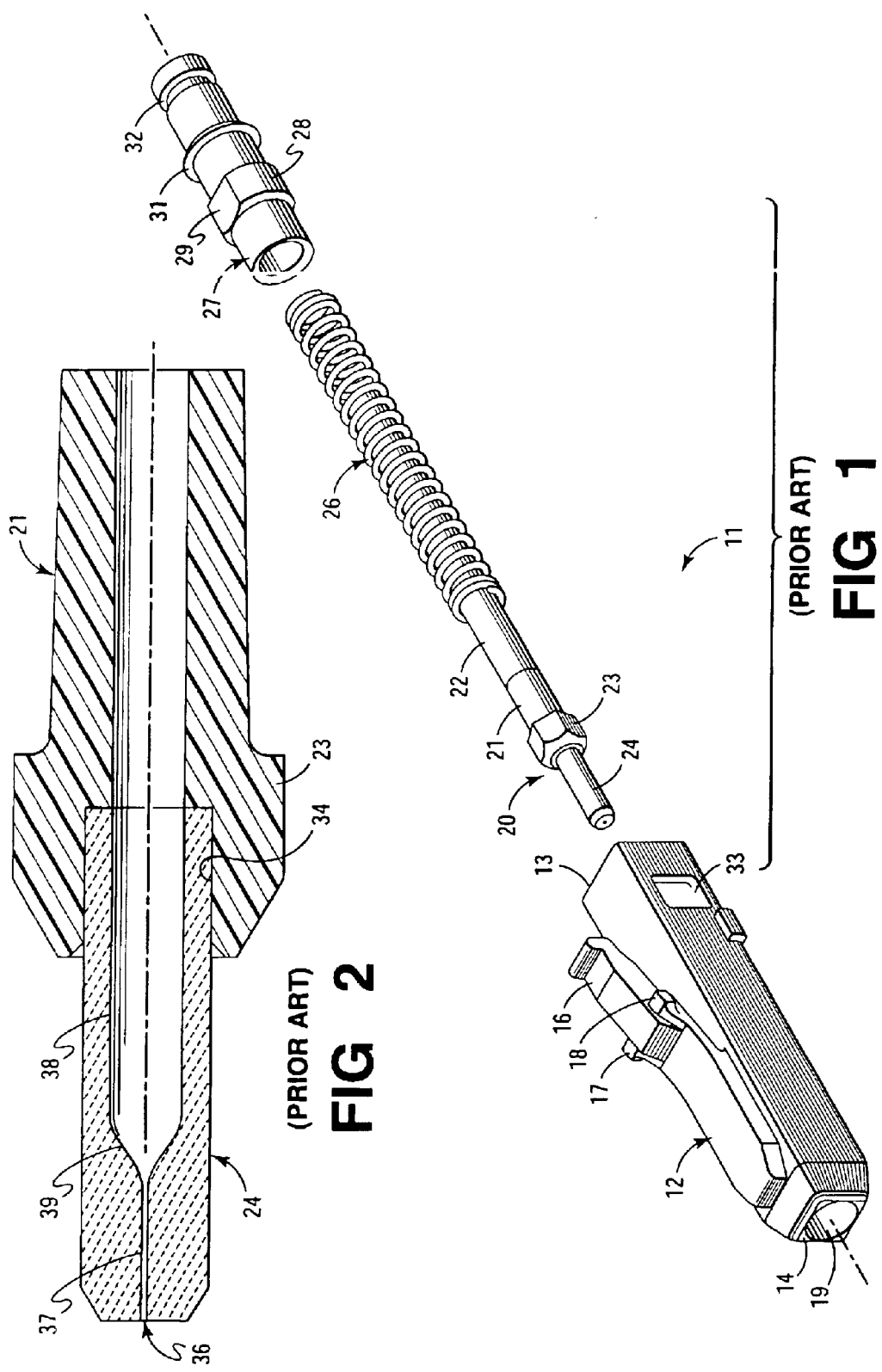

OPTICAL FIBER CONNECTION UTILIZING FIBER CONTAINING FERRULES

FIELD OF THE INVENTION

This invention relates to optical fiber connectors, and more particularly, to such connectors having fiber containing ferrules.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the fiber ends in a butting relationship such that the core of one of the fibers is axially aligned with the core of the other fiber so as to maximize light transmissions from one fiber to the other. Another goal is to minimize back reflections. Such alignment is extremely difficult to achieve, which is understandable when it is recognized that a fiber is 125.0±0.5 microns and that the mode field diameter, of, for examples, a singlemode fiber is approximately nine microns (0.009 mm) and a multimode fiber is 50 microns (0.050 mm). Good alignment (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects. These same considerations apply to arrangements where the fiber, terminated in a plug connector, is to be used with active or passive devices, such as, for example, data links for computers or transceivers and the like.

In the present day state of the art, there are numerous, different, connector designs in use for achieving low insertion loss and stability. In most of these designs, typically a pair of ferrules (one in each connector or one in the connector and one in the apparatus or possibly in the device), each containing an optical fiber end which is adhesively bonded or cemented in an axial bore within the ferrule, are butted together end-to-end, and light travels across the junction. The fibers are usually bonded within the ferrules and the adhesive is cured during manufacture to produce a connectorized fiber. It is possible that the ferrule of a connector may also be plugged directly into the bore of a wide area detector or receiver.

In U.S. Pat. No. 6,128,927 of Ahrens, et al, there is shown a method and apparatus for precisely controlling the diameter of the bore in a ferrule. The method comprises producing a ferrule, preferably of glass, having an oversized bore therein. A rod of metal, such as stainless steel, having a diameter substantially the same as the diameter of the fiber to be contained in the ferrule bore, is inserted in the oversized bore and the assembly is heated to collapse the glass ferrule around the rod. The assembly is then cooled, as by dipping in liquid nitrogen, so that the rod may be extracted, leaving a ferrule bore (at normal temperature, having a diameter equal to the diameter of the fiber). This is a production process for manufacturing ferrules, and is unsuitable for use in the field. Additionally, it appears that the fiber, after insertion in the ferrule bore, is cemented in place.

It is desirable that an installer in the field has the capability of replacing a connector on a fiber end, or mounting a connector to a newly created fiber end, as in splicing. Further, in replacing a connector that has been damaged, for example, the faulty connector must simply be cut off and discarded inasmuch as the fiber is cemented therein, and a new connector attached to the now somewhat shortened fiber. In the present state of the art, this means that the installer must have in his kit the adhesive, which if the adhesive is a two-part system, would have a limited pot-life, or an anaerobic adhesive would require the use of a catalyst, or a UV cement that would require a UV curing means therefore, and new fiber connectors (unmounted). Adhesives and cements are messy to handle and can also contaminate the precision outside surface of the ferrule if extreme care is not exercised. From a practical standpoint, adhesive or cement is messy to use; and from an economic standpoint, therefore, it becomes an expensive operation. Elimination of the need to bond the fiber within the ferrule using adhesives or cements, and the concomitant discarding of the connector being replaced, would be highly desirable.

SUMMARY OF THE INVENTION

The present invention overcomes the foregoing drawbacks of the prior art by making use of what has become known as NT Alloys (NTA) of which Ti Ni alloy systems have proved the most efficacious in achieving the aims and ends of the present invention. In 1965, the first of a series of metal alloys of nickel and titanium was produced by the Naval Ordnance Laboratory. These alloys are called Nitinol, for Nickel Titanium Naval Ordnance Laboratory. Many of the alloys have a rather remarkable property: they remember their shape. This "smart" property is the result of the substance's ability to undergo a phase change—a kind of atomic ballet in which atoms in the solid subtly shift their positions in response to a stimulus like a change in temperature or application of mechanical stress.

One such manufacturer of shape memory NT alloys is Furukawa Electric Co., LTD. NT alloys typically fall into two applications, shape memory alloys (SMA) and super-elastic alloys (SEA). A website in English is available at http://www.fitec.co.jp/ftm/nt-e/index_f.htm for Furukawa's NT Alloys including their Super-elastic NT-Tubes. A unique property of these materials, is that an item made of such an alloy can be formed to have an original shape, and then heated and subsequently cooled to have a secondary shape. Upon subsequent heating, the item will revert back to its original shape. NT shape memory alloy materials work by expanding and contracting between their martensitic—to—austenitic (phase) transformations. The physical transformation is achieved by heating the material while it is under a fixed load. Because of their unique characteristics NTAs have been used in a wide variety of fields such as, for example:

Shutters for fiber optic adapters that recover over many 100's of cycles using NT-foils with thickness down to 0.03 mm and width up to 60 mm.

Recoverable eyeglass frames using super-elastic wire giving comfortable fit and exceptional strength while withstanding large deformation stress.

Medical applications such as medical guidewires with high stiffness and no yield point, which does not show a super-elastic plateau. The residual strain is above 4% strain, these wires have superior straightness and torque transmitting ability, resulting in greatly improved invasive push-ability. Also available are super-elastic alloys for applications which require large amount of deformation and a wide recoverable strain range. In addition to guidewires, thin-wall, small diameter super-elastic NT tubes are also being adapted for use as catheter tubing.

Electrical applications requiring actuators, such as, NT wire for actuator, such as NT-H7-TTR to miniaturize and reduce the cost of the actuator. In this case, NT (Shape memory alloy) wire expands and contracts between its martensitic—to—austenitic (phase) transformations. The physical transformation is achieved by heating the wire while it is under a fixed load. Due to NT's electrical resistance being high, this wire is heated by simply applying electric current. Therefore by controlling the electric current, the expansion and contraction cycle form an actuator device.

The Ti Ni alloys have good fatigue properties and are, in general, the most favored for use as SMA material, although other alloys have been known to exhibit similar characteristics.

The present invention, in a first preferred embodiment thereof, is a ferrule, preferably injection molded of zirconia-ceramic or a highly silica-filled polymer, having an axial bore extending therethrough.

In accordance with the invention, a sleeve (capillary tube) of NTA (SMA) material is inserted in the bore of the ferrule in a light press fit, or, alternatively, is cemented therein. As will be discussed more fully hereinafter, the sleeve has an initial or primary configuration wherein its inside diameter (ID) is slightly less than the outside diameter of the fiber to be inserted therein. Prior to insertion, the sleeve has been reworked through heating and mechanical means to a secondary configuration, in which the ID is somewhat greater than the fiber diameter, by temporarily positioning a pull-pin in the capillary that can later be removed allowing easy insertion of the fiber into the sleeve, and hence, the ferrule. After insertion of the fiber into the sleeve, the sleeve is reheated, with a method as simple as the heat-source of an ordinary match, causing its ID to return to the initial state, where it firmly clamps the fiber. Thus the fiber is held tightly in place within the ferrule without the use of cement.

In a second embodiment of the invention, the ID of the sleeve in its secondary state is profiled to have an enlarged portion at the rear of the sleeve and a "gripping" or clamping portion at the front portion, which, when returned to the primary or initial state, grips the fiber firmly at the front of the ferrule but leaves some "slop" at the rear thereof. This facilitates insertion and withdrawal of the fiber.

In still another embodiment of the invention, the central bore of the ferrule molded of zirconia-ceramic has opposed longitudinally extending hollow lobes rather than a secondary cylindrical capillary tube. Within the bore are first and second V-shaped NTA members, the V-shape being the secondary configuration of the NTA members, the initial configuration being flat. The fiber to be contained in the ferrule is inserted in the fiber bore between the two V-shaped members. When heat is applied to the NTAs, they flatten into their initial state, with the ends of each of the two arms of the V-shaped members sliding into the lobes. The end result is two flat members tightly bearing against the fiber to clamp and hold it firmly in place, without the necessity of an adhesive or cement or the like. The fiber can be removed by the application of heat to the NTA members, softening them enough to enable withdrawal of the fiber. With careful design and a precision push-pull pin, it would be possible to re-shape the now flattened NTA members back into V-shaped members for re-use.

In another embodiment of the invention, the ferrule bore has a circular precision surface for receiving the fiber, with lobes on each side, and an enlarged portion of the bore for receiving a single V-shaped SMA (preferably (NTA) strip. The fiber is inserted in the bore and preferably projects slightly above the precision surface. Where the V-shaped strip is heated, it flattens out, as explained in the foregoing and bears against the fiber, pressing it against the precision surface and clamping and holding it firmly therewithin. Thus the fiber is centrally contained within the bore.

It is also conceivable to place a fiber-stub with or without a high-temperature index match in order to incorporate a pre-polished stub in the connector assembly in a controlled factory environment, so that the field assembly of the connector on the fiber will be further simplified.

In these and other possible embodiments of the invention, the fiber is gripped by the NTA member or members in the initial state. It is also possible to reverse the process to grip the fibers by NTA members in the secondary state.

The various principles and features of the present invention will be more clearly understood from the following detailed description, read in conjunction with the accompanying drawings.

BRIEF DESCRIPTION OF THE DRAWINGS

FIG. 1 is an exploded perspective view of a typical plug type optical fiber connector utilizing a ferrule;

FIG. 2 is a cross-sectional elevation view of a ferrule mounted in the barrel member of the connector;

DETAILED DESCRIPTION

Figure 3:
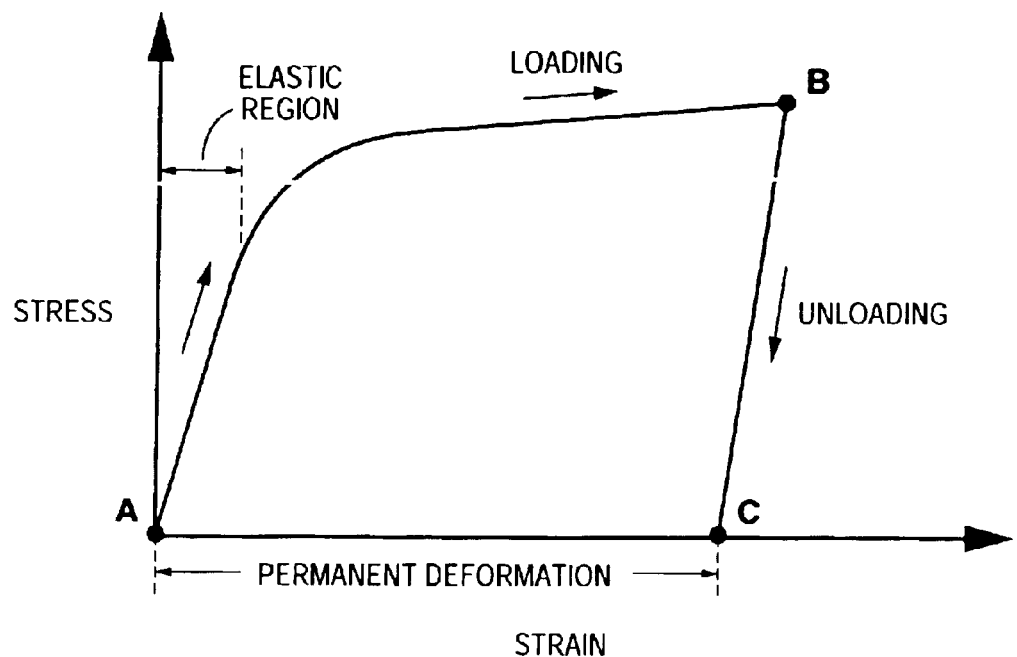
FIGS. 3 and 4 are diagrams of the behavior of ordinary metals and NTA metals under stress and temperature.

FIG. 1 is an exploded perspective view of a prior art plug connector 11 of the LC type to illustrate the location of the ferrule 24. Although an LC type connector is shown, the invention is applicable to any of a large number of connector types. Connector 11 comprises a housing 12 having a cable entrance end 13 and a ferrule end 14. A latching arm 16 which has first and second latching lugs 17 and 18 extends from housing 12, and functions to latch the plug connector 11 in place. Housing 12 and arm 16 are preferably made of a suitable plastic material which has sufficient resilience to allow the latching arm 16 to be depressed for insertion and to spring back into its latching position.

Housing 12 has an axial bore 19 extending therethrough which accommodates a ferrule-barrel assembly 20. Assembly 20 comprises a flexible hollow tubular member 22 attached to a metal or hard plastic barrel member 21 with an enlarged flange 23 from which extends a ferrule 24 which may be of a suitably hard or wear resistant material such as, preferably, ceramic, glass, highly silica-filled polymer, or metal and which functions to contain an optical fiber therein. A coil spring 26 surrounds tubular member 22 and seats against the rear of flange 23 at its forward end, and against an insert 27 at its rear end. Insert 27 is tubular and accommodates tubular member 22.

Insert 27 has an enlarged diameter section 28 having first and second flats 29 (only one of which is shown) thereon which enable insertion of insert 27 into the end of bore 19 at the cable entrance end 13 of housing 12, which has a generally square configuration as is shown, for example, in U.S. patent application Ser. No. 09/413,431 of Driscoll, et al. filed Oct. 6, 1999. Insert 27 also has a flange 31 thereon which functions as a stop to prevent insert 27 from being inserted too far into the housing. At the cable receiving end of insert 27 is a groove 32 for receiving strength members (not shown) usually crimped thereto. Each of the sidewalls of housing 12 has an opening 33 for receiving the enlarged diameter portion 28 of insert 27 to fix the insert longitudinally in place.

The flange 23, shown here as having a polygonal shape, has ferrule 24, which extends therefrom, fixed within a central bore 34 of flange 23, as by press-fitting, as best seen in FIG. 2.

FIG. 2 is a cross-sectional view of a typical ferrule 24, which may e of any of a number of different materials, although, as pointed out hereinafter, in accordance with the invention, the ferrule 24 is preferably an injection-molded zirconia-ceramic or of highly silica-filled polymer. The ferrule 24 has an axial bore 36 extending therethrough that has a forward section 37 within which the fiber (not shown) is generally cemented, and a rear enlarged diameter section 38 and conical entry section 39 for facilitating insertion of the fiber into section 37. Ferrule 24 is affixed to flange 23 by insertion and cementing in bore 34 thereof. The ferrule shown in FIG. 2 is commonly called a nozzle ferrule because enlarged diameter section 38 is extended for some length into the ferrule 24. However, ferrules are also made without the enlarged diameter where the axial bore is extended nearly the length of the ferrule with the conical section 39 relocated the fiber entry end of the ferrule.

When ordinary metallic materials have an excessive stress loads applied beyond their elastic limits, they will not fully restore to their original shapes. Permanent deformation will remain after removal of the excessive stress load.

However, when NT shape memory alloys have excessive stress loads applied beyond their elastic region and at a temperature less than the transformation (Af) temperature, it undergoes a plastic-like deformation. When heated to higher than the transformation, the deformation disappears and the original shape is restored. These super-elastic NT alloys can accept an excessive stress load up to ten times the alloy's elastic stress region and at a temperature higher than the transformation temperature. When the excessive stress load is removed, the deformation disappears and the alloy restores its original shape.

Figure 4:
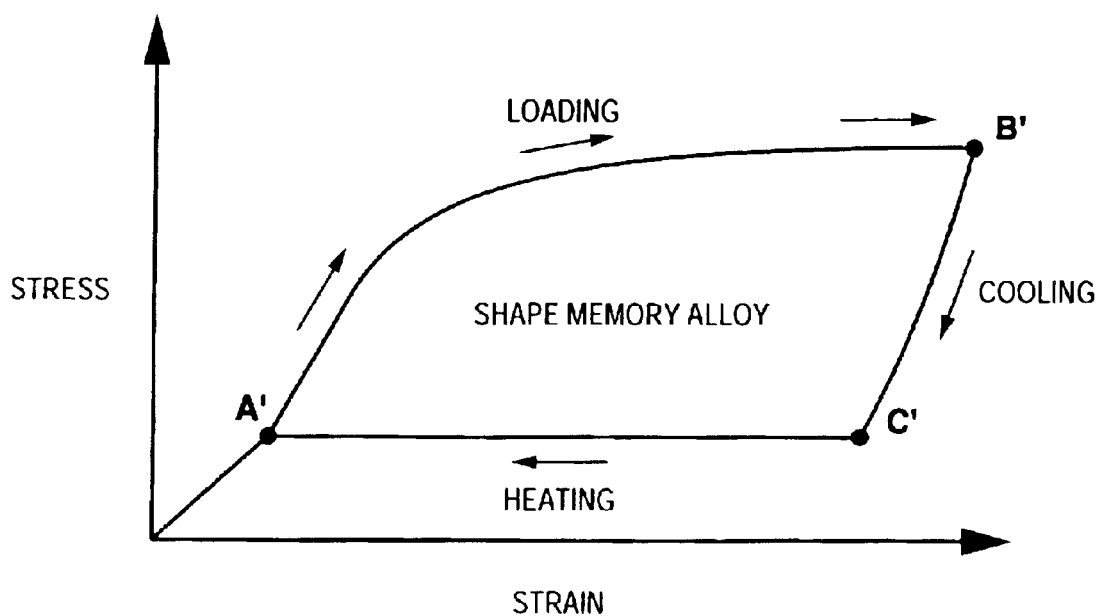

FIG. 3 is a diagram of the behavior of ordinary metals such as, for example, steel or aluminum, under stress (including heat), and FIG. 4 depicts the behavior of an NT shape memory alloy under the same or similar conditions of stress and heat. In FIG. 3 it can be seen that the normal metal of whatever device has a normal position or initial configuration (shape) as indicated at A and, under stress, moves to a deformed shape that exceeds the elastic limit of the material as indicated at B. When the stress is removed, there is some relaxation of the stressed metal, but it remains permanently deformed in a second configuration, as indicated at C. In FIG. 4 it can be seen that when the SMA material, at its primary configuration A' is stressed by cold working, for example, the device made of NT material will be deformed under load to B' and, after cooling, retains a deformed configuration at C'. Unlike the metal of FIG. 3, when heat of a temperature of 50° to 120° (depending on the alloy) is applied to the deformed member or device, the device will revert to its primary configuration as shown. It is this behavior of NT (SMA) material which forms the operative basis of the present invention in affixing the fiber within the ferrule without the use of cement or other materials.

NiTi shape memory metal alloy can exist in a two different temperature-dependent crystal structures (phases) called martensite (lower temperature) and austenite (higher temperature or parent phase). When martensite NiTi is heated, it begins to change into austenite. The temperature at which this phenomenon starts is called austenite start temperature ($A_s$). The temperature at which this phenomenon is complete is called austenite finish temperature ($A_f$). When austenite NiTi is cooled, it begins to change onto martensite. The temperature at which this phenomenon starts is called martensite start temperature ($M_s$). The temperature at which martensite is again completely reverted is called martensite finish temperature ($M_f$). The transformation from austenite to martensite can be accomplished in different ways. The temperature range for the martensite-to-austenite transformation, i.e. soft-to-hard transition that takes place upon heating is somewhat higher than that for the reverse transformation upon cooling.

Not only can the ID be trained, but also the entry funnel can be formed at the fiber entry end of the capillary. The material can be permanently formed in the approximately 500 degree C. range by use of a mandrel, to have an entry funnel and a 122.6.0-micron capillary, for example. This insert can then be cooled to its' martinsetic stage, where the material takes on softer, more elastic properties mentioned earlier. A secondary preferably tapered mandrel is then inserted to expand the hole approximately 6% on the diameter, from a hole-size to tightly grip the 125-micron diameter fiber to a larger ID for easy insertion of the fiber (for example, from 122.6 to 130.0-microns). The hole can be enlarged using a mandrel under axial force while the NTA material is in the softer martensitic phase. To prevent the hole from collapsing prematurely, the mandrel can be left in place or replaced by a disposable pin (mandrel), where a 5 to 6% increase in restorable deformation would be equal to 1.06 times the existing circumference divided by $\pi$ (pi) to get the new expanded diameter (128.7 to 130.0-mcrons). This is an acceptable range to easily insert the 125 $\mu$m diameter fiber.

Figure 7:
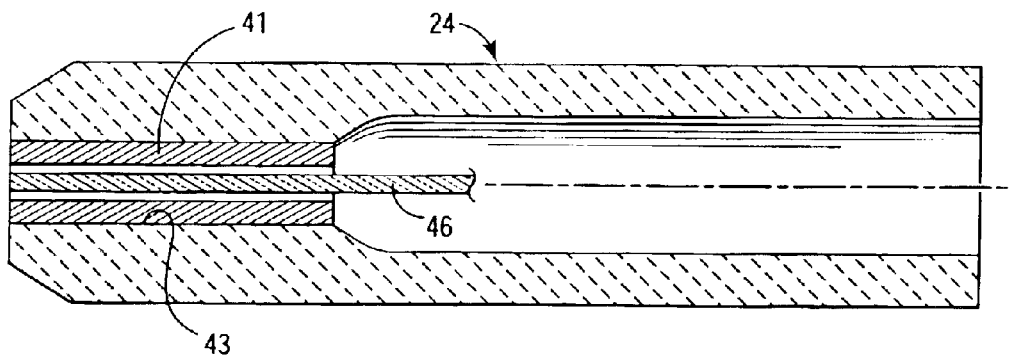
FIG. 7 is a cross-sectional view of the sleeve of FIG. 6 mounted in the ferrule.
Figure 8:
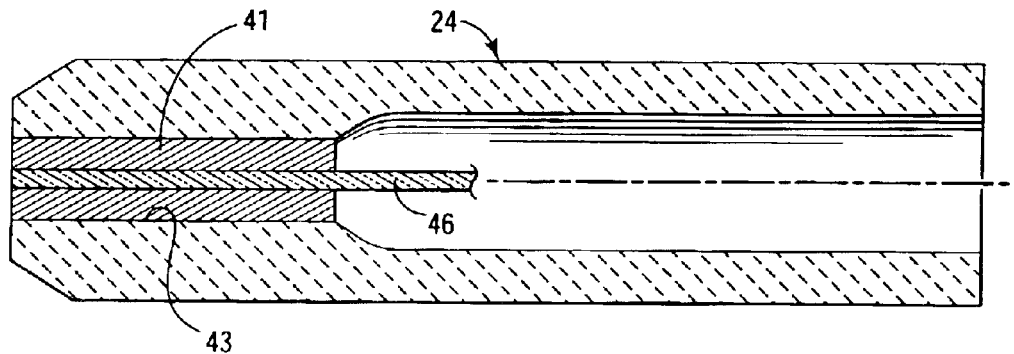
FIG. 8 is a cross-sectional view of the sleeve of FIG. 5 in the primary configuration in the ferrule.

In accordance with the present invention a cylindrical sleeve 41 (FIG. 5) of shape memory alloy has a centrally located bore 42 therein which has, in the primary configuration a diameter slightly less than the diameter, e.g., 123 $\mu$m, of the fiber to be contained in the ferrule. The outside diameter (O.D.) of the sleeve is dimensional to be a light press fit in an enlarged bore 43 in the ferrule front end, as best seen in FIGS. 7 and 8. In addition, since the sleeve is intended to be a permanent part of the ferrule 24, it may be cemented in place therein.

In accordance with the present invention a cylindrical sleeve 41 (FIG. 5) of shape memory alloy has a centrally located bore 42 therein which has, in the primary configuration a diameter slightly less than the diameter, e.g., 123 μm, of the fiber to be contained in the ferrule. The outside diameter (O.D.) of the sleeve is dimensional to be a light press fit in an enlarged bore 43 in the ferrule front end, as best seen in FIGS. 7 and 8. In addition, since the sleeve is intended to be a permanent part of the ferrule 24, it may be cemented in place therein.

Figures 5, 6:
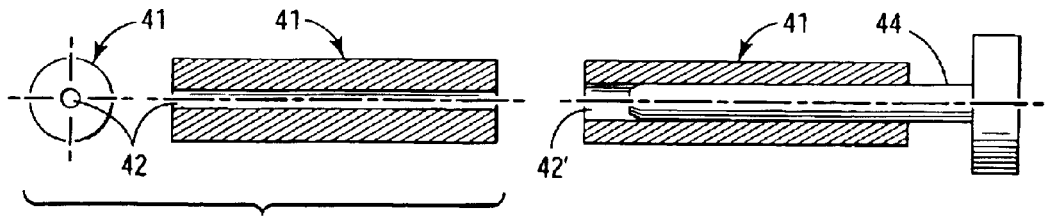
FIG. 5 is a cross-sectional view and end view of the sleeve or capillary tube of the invention in its primary configuration.
FIG. 6 is a cross-sectional view of the sleeve of FIG. 5 in its deformed or secondary configuration.

In FIG. 6, the sleeve (or capillary tube) is shown as having been distorted to a secondary configuration wherein the bore 42' has an enlarged diameter sufficient to allow insertion of the optical fiber therein. This is accomplished by heating and/or mechanically working the bore 42 by insertion of a pull-pin 44, which has an outside diameter of the desired dimension therein to produce the slightly larger bore 42'. Of course this pull-pin could have a tapered portion to ease entry. This diameter 42' only needs to be, for example, one or two microns greater than the diameter of the optical fiber. When the sleeve 41 cooled, and the pin 44 is removed, it retains the bore 42' of 127 μm, for example. As shown in FIG. 7, the sleeve 41, in its secondary configuration is shown in bore 43 of ferrule 24 and affixed thereto. In this state, the ferrule 24 and the connector 11 in which it is mounted can be a part of an installer's kit and transported to where needed.

In securing an optical fiber 46 in the sleeve, and hence the ferrule 24, the fiber 46 is inserted into the sleeve as shown in FIG. 7, and the ferrule 24 and sleeve 41 are heated to a temperature sufficient to return the sleeve to its primary configuration where it tightly grips the fiber 46, as shown in FIG. 8, because of the diameter of bore 42 decreasing to its original dimension. Although the presence of the fiber 46 within the bore 42 prevents a complete return to the original diameter of bore 42, the property of the NT material is such that bore 42 will exert great pressure on the fiber 46 sufficient to fix it firmly in position, without the necessity of cement.

As a variation on the aforementioned steps in mounting the fiber in the NT sleeve, the fiber 46 may be inserted in the sleeve 41 which is returned then to its primary configuration, and then the sleeve 41 may be inserted in, and affixed to bore 44 of ferrule 24. In this process, however, extreme care must be exercised to avoid damage to the fiber.

Figure 9:
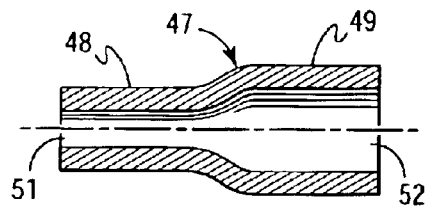
FIG. 9 is an alternative shape of the sleeve of the invention.

It is not necessary that the fiber be affixed along its entire length within the sleeve 41, although the fiber should be firmly held in place and aligned concentrically at the front end of the ferrule. FIG. 9 depicts a modified sleeve 47 in its primary configuration having a stepped bore of a first forward internal diameter section 51 and a rearward section 52 of a larger diameter. The outside shape of the sleeve is also stepped with a front diameter portion 48 and a rear diameter portion 49. The bore 43 of the ferrule must be modified to accommodate the stepped shape of the sleeve, or alternatively, shortened to accommodate only front portion 48 thereof. In the configuration of sleeve 47, it is only necessary to enlarge the diameter of bore portion 51 as described in the foregoing, inasmuch as bore portion 52 is not intended to grip the fiber, but is intended to facilitate insertion of the fiber into portion 51.

Figure 10:
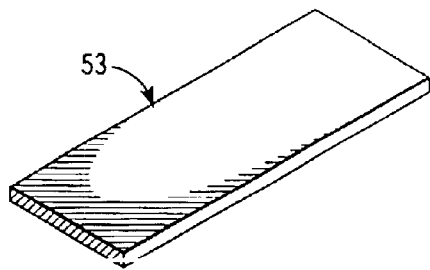
FIG. 10 is a perspective view of an NTA planar strip in its primary configuration.
Figure 11:
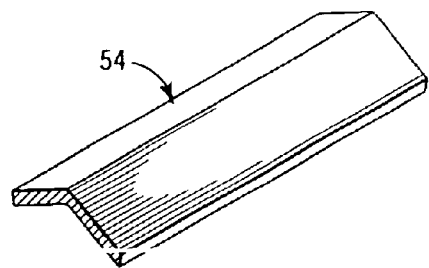
FIG. 11 is a perspective view of the strip of FIG. 10 as deformed for use in a ferrule.
Figure 12:
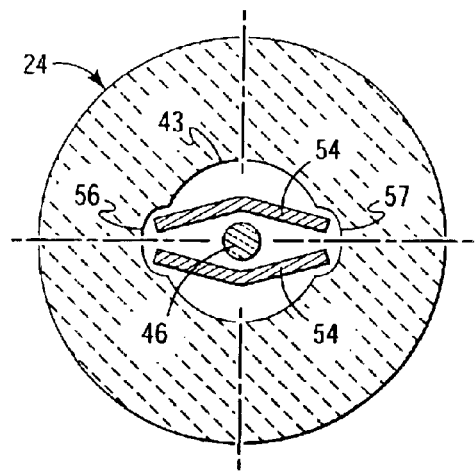
FIG. 12 is a front view of a ferrule as modified to receive two of the strips of FIG. 11.
Figure 13:
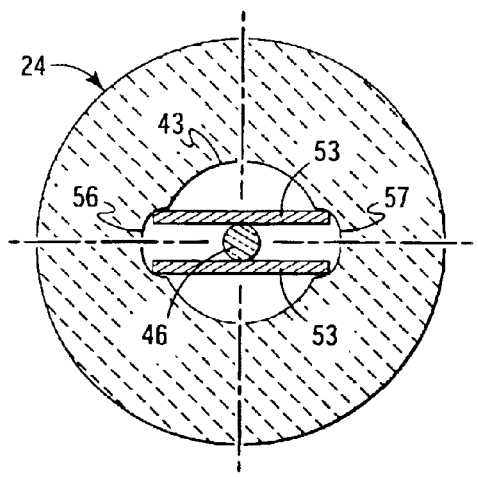
FIG. 13 is the ferrule of FIG. 12 with the planar strips in their primary configuration gripping the fiber.

NTA material is available in planar strip form, such as is shown in FIG. 10 as planar strip 53, in its primary configuration. As with tubular and other shapes, the strip 53 may be deformed by mechanically forming, for example, into a secondary configuration, such as the V-shaped strip 54 of FIG. 11. This configuration can also be used to secure the fiber 46 securely within the ferrule 24, as shown in FIGS. 12 and 13. Ferrule 24, as shown, has a central bore 43 in the same manner as the ferrules shown in FIGS. 7 and 8. However, the bore has extending along the operative length thereof first and second diametrically opposed hollow lobes or grooves 56 and 57 which open into bore 43. As shown in FIG. 12, two deformed V-shaped strips 54 are located within bore 43 with their outer edges immediately adjacent the lobes or grooves 56 and 57, and the optical fiber 46 is inserted therebetween. Upon the application of heat, strips 54 return to the planar primary configuration of FIG. 10, becoming near planar strips 53, as shown in FIG. 13. The edges of the strips are forced into the hollow lobes 56 and 57 and held in place thereby. As a consequence, the fiber 46 is held firmly in place within the ferrule.

Figure 14:
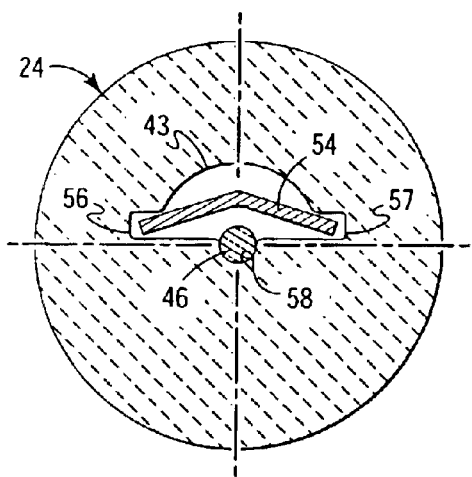
FIG. 14 is a front view of a ferrule as modified to receive one of the strips of FIG. 11.
Figure 15:
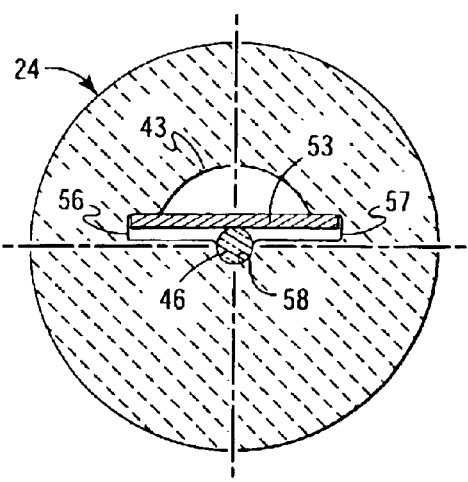
FIG. 15 is the ferrule of FIG. 14 with the planar strip in its primary configuration bearing tightly against the optical fiber.

In FIG. 14 there is shown an embodiment of the invention which utilizes the principles of the embodiment of FIGS. 12 and 13, but requires only one strip of SMA material to achieve the desired result. For simplicity, like parts bear the same numerical designation as in FIGS. 12 and 13. Thus the ferrule 24 has a central bore 43 therein. However, the central bore has a precision approximately semi-circular surface 58 therein, having a radius of approximately 62.5 μm to 63.5 μm within which the fiber 46 rests. This semi-circular surface could also be a V-groove, for example, that would also position a nominal diameter fiber core substantially coaxially with the centerline of the ferrule 24 OD. For clarity, the fiber 46 has been shown larger than in FIGS. 12 and 13. The lobes or grooves 56 and 57 extend laterally from the upper edges of the precision surface 58 and the upper portion of the bore 43 is shaped to receive a single V-shaped SMA strip 54. When the strip 54 is heated, it flattens out and bears tightly against the fiber 46, as shown in FIG. 15, thus holding it firmly in place against the surface 58.

In all of the foregoing embodiments of the invention, the gripping and affixing of the fiber is realized by heating the NT material until it returns to its primary configuration. The amount of heat may vary, but it has been found that the heat of a hair dryer is sufficient in most cases to achieve the desired result. Thus, the operator or installer, needing a heat source, may easily add a high-powered hair dryer to his kit.

It is to be understood that the various features of the present invention might readily be incorporated into other types of connectors or other optical fiber devices, and that other modifications or adaptations might occur to workers in the art. All such variations and modifications are intended to be included herein as being within the scope of the present invention as set forth. Further, in the claims hereinafter, the corresponding structures, materials, acts, and equivalents of all means or step-plus-function elements are intended to include any structure, material, or acts for performing the functions in combination with other elements or specifically claimed.

What is claimed is:

1. For use in optical fiber connector apparatus an optical fiber containing member comprising:

an elongated ferrule member having a longitudinal bore extending from a front end thereof toward the rear end thereof; and a clamping member within said bore for bearing against the optical fiber for fixing it in place;

the material of said clamping member comprising a shaped memory alloy (SMA) having primary and secondary configuration, said clamping member substantially surrounding and in gripping contact with at least a portion of the fiber in the primary configuration.

2. The optical fiber containing member as claimed in claim 1 wherein the shaped memory alloy material is an NT alloy.

3. The optical fiber containing member as claimed in claim 2 wherein said NT alloy is a Ti Ni alloy.

4. The optical fiber containing member as claimed in claim 1 wherein said clamping member has a primary configuration and can be stressed to a secondary or deformed configuration different from said primary configuration.

5. The optical fiber containing member as claimed in claim 4 wherein said clamping member comprises a sleeve contained within said longitudinal bore, said sleeve having an axial bore therein having a diameter in the primary configuration less than the diameter of the fiber.

6. The optical fiber containing member as claimed in claim 5 wherein said axial bore has a diameter in the secondary configuration greater than the diameter of the fiber.

7. For use in optical fiber connector apparatus, an optical fiber containing member comprising:

an elongated ferrule member having a longitudinal bore extending from a front end thereof toward the rear end thereof and having first and second approximately diametrically opposed hollow lobes extending along at least a portion of its length;

a first clamping member within said bore for bearing against the optical fiber for fixing it in place;

the material of said first clamping member comprising a shaped memory alloy (SMA) having primary and secondary configurations; and said first clamping member having V-shaped configuration in the secondary configuration.

8. The optical fiber containing member as claimed in claim 6 wherein said sleeve is affixed within said bore of said elongated ferrule member.

9. The optical fiber containing member as claimed in claim 7 wherein said first clamping member has a planar strip primary configuration and bears against a fiber in said longitudinal bore to clamp it in place therein.

10. The optical fiber containing member as claimed in claim 9 wherein the side edges of said planar strip configuration are within said lobes in its primary configuration.

11. The optical fiber containing member as claimed in claim 7 and further having a second clamping member within said bore having a V-shaped secondary configuration with the open end of the V-shaped being opposite the open end of said first V-shaped clamping member.

12. The optical fiber containing member as claimed in claim 11 wherein said first and said second clamping members each has a planar strip primary configuration wherein each of said clamping members bears against a fiber in said longitudinal bore to clamp it in place therein.

13. The optical fiber containing member as claimed in claim 12 wherein the side edges of each of said planar strip configuration clamping members are within said lobes.

* * * * *